(12) United States Patent
Sigona

(10) Patent No.: US 10,060,763 B2
(45) Date of Patent: Aug. 28, 2018

(54) SENSOR ASSEMBLY FOR MEASURING THE RELATIVE POSITION OF A CONTROL ROD CONNECTED TO A LEAD SCREW WITHIN A NUCLEAR REACTOR

(71) Applicant: ROLLS-ROYCE POWER ENGINEERING PLC, Derby (GB)

(72) Inventor: Angelo Sigona, Leicester (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 191 days.

(21) Appl. No.: 14/734,332

(22) Filed: Jun. 9, 2015

(65) Prior Publication Data

US 2015/0369632 A1    Dec. 24, 2015

(30) Foreign Application Priority Data

Jun. 20, 2014    (GB) .................................. 1411032.4

(51) Int. Cl.
*G21C 17/10*    (2006.01)
*G21C 17/12*    (2006.01)
(Continued)

(52) U.S. Cl.
CPC ........... *G01D 5/204* (2013.01); *G01D 5/2046* (2013.01); *G01D 18/00* (2013.01); *G01V 3/10* (2013.01);
(Continued)

(58) Field of Classification Search
CPC .. G01D 5/2216; G01D 5/2013; G01D 5/2046; G01D 5/2258; G01D 5/2291;
(Continued)

(56) References Cited

U.S. PATENT DOCUMENTS 4,013,911 A * 3/1977 Fujiwara ................. H01F 29/10
310/168
4,052,686 A    10/1977 Schmitz
(Continued)

FOREIGN PATENT DOCUMENTS

CN    1147677 A    4/1997
GB    655367 A    7/1951
(Continued)

OTHER PUBLICATIONS

Nov. 6, 2015 Extended Search Report issued in European Patent Application No. 15171156.1.
(Continued)

*Primary Examiner* — Alesa Allgood

(74) *Attorney, Agent, or Firm* — Oliff PLC

(57) ABSTRACT

A sensor assembly for indicating the relative location of a metallic object. The sensor assembly including a primary electromagnetic coil arranged to generate a time varying magnetic field, and a secondary electromagnetic coil arranged to detect the time varying magnetic field as affected, directly or indirectly, by the object and to output, on the basis of the detected time varying magnetic field, a signal indicative of the relative location of the object. At least one of the primary and secondary electromagnetic coils is wound about a core body formed of a material having the same conductivity and/or magnetic permeability as the object.

11 Claims, 13 Drawing Sheets

(51) Int. Cl.
*G01D 5/20* (2006.01)
*G01V 3/10* (2006.01)
*G21C 7/18* (2006.01)
*G01D 18/00* (2006.01)
*G21C 7/08* (2006.01)
*G21C 7/12* (2006.01)

(52) U.S. Cl.
CPC .............. *G21C 7/08* (2013.01); *G21C 7/12* (2013.01); *G21C 7/18* (2013.01); *G21C 17/10* (2013.01); *G21C 17/12* (2013.01); *Y02E 30/39* (2013.01)

(58) Field of Classification Search
CPC ........... G21C 17/12; G21C 7/12; H01F 29/10; G01B 7/14
See application file for complete search history.

(56) References Cited

U.S. PATENT DOCUMENTS

| | | | | |
|---|---|---|---|---|
| 4,170,754 | A * | 10/1979 | Schmitz | G01D 5/2046 324/207.17 |
| 4,714,926 | A * | 12/1987 | Neuner | G21C 17/12 336/55 |
| 5,066,911 | A | 11/1991 | Hulsing, II | |
| 5,539,308 | A | 7/1996 | Teramae et al. | |
| 5,563,922 | A * | 10/1996 | Beltz | G21C 7/12 324/207.17 |
| 5,994,897 | A | 11/1999 | King | |
| 6,034,624 | A | 3/2000 | Goto et al. | |
| 2006/0164075 | A1* | 7/2006 | Niwa | G01D 3/0365 324/207.16 |
| 2007/0200562 | A1* | 8/2007 | Shimomura | G01V 3/102 324/222 |
| 2013/0034918 | A1 | 2/2013 | Dusemund et al. | |

FOREIGN PATENT DOCUMENTS

| | | | | |
|---|---|---|---|---|
| GB | 2000298 | A | 1/1979 | |
| GB | 2479773 | * | 10/2011 | ............ G21C 17/10 |
| GB | 2479773 | A | 10/2011 | |
| JP | S55155202 | A | 12/1980 | |
| JP | 2000337809 | A | 12/2000 | |
| JP | 2004184356 | A | 7/2004 | |
| JP | 2009158149 | A | 7/2009 | |
| WO | 2013034918 | A1 | 3/2013 | |

OTHER PUBLICATIONS

Oct. 13, 2015 Partial Search Report issued in European Patent Application No. 15 17 1157.
U.S. Appl. No. 14/734,649, filed Jun. 9, 2015 in the name of Sigona.
U.S. Appl. No. 14/734,292, filed Jun. 9, 2015 in the name of Sigona.
Wang, Hongbo et al. "Design of Ultrastable and High Resolution Eddy-Current Displacement Sensor System." IECON 2014—40th Annual Conference of the IEEE Industrial Electronics Society, IEEE, Oct. 28, 2014, p. 2333-2339.
Jan. 30, 2015 Search Report issued in British Application No. GB1411032.4.
Jan. 30, 2015 Search Report issued in British Application No. GB1411034.0.
Nov. 12, 2014 Search Report issued in British Application No. GB1411033.2.
Prakash et al., "Development of diverse methods for drop time measurement of PFBR shut down mechanisms," IAEA International Atomic Energy Agency, Proceedings of an International Conference: Fast Reactors and Related Fuel Cycles: Challenges and Opportunities, Mar. 4, 2013, France.
Oct. 30, 2015 Search Report issued in European Patent Application No. 15 17 1154.
Apr. 10, 2017 Office Action Issued in U.S. Appl. No. 14/734,649.
Jun. 23, 2017 Office Action issued in U.S. Appl. No. 14/734,649.

\* cited by examiner

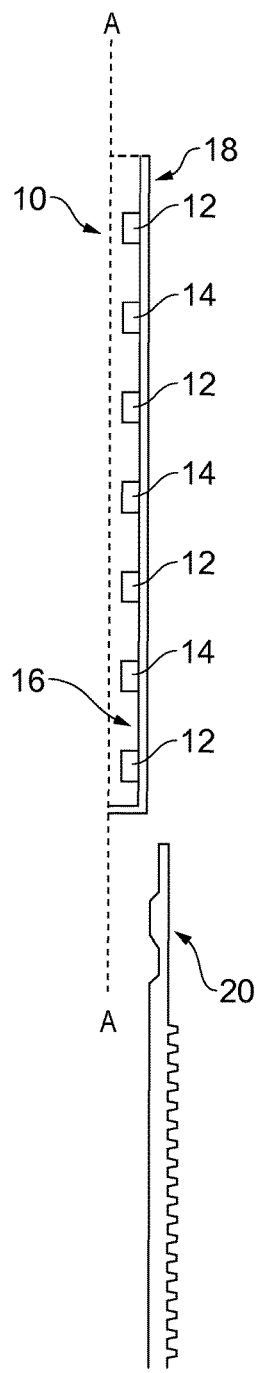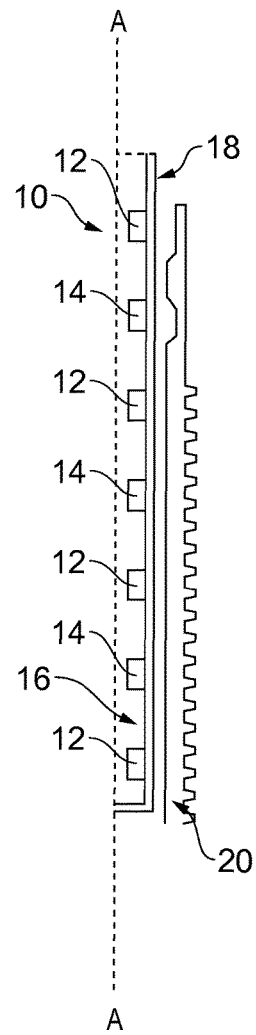
FIG. 1A
FIG. 1B

SENSOR ASSEMBLY FOR MEASURING THE RELATIVE POSITION OF A CONTROL ROD CONNECTED TO A LEAD SCREW WITHIN A NUCLEAR REACTOR

TECHNICAL FIELD

The present invention relates to a sensor for sensing a metallic object through another metallic object. In particular, but not exclusively, the present invention relates to a sensor for measuring the relative position of a control rod within a nuclear reactor from within a metallic probe tube housing the sensor.

BACKGROUND

Means for measuring or detecting the position of a control rod within a nuclear reactor are limited by the fact that the measurement needs to be made within the primary water for the nuclear reactor.

A conventional method for determining the relative location of a control in a nuclear reactor is to use a metallic probe tube which extends into the primary water region, and which houses a coil of wire forming an inductive element that forms part of an electrical circuit.

The probe tube is positioned such that a metallic leadscrew attached to the control rod moves telescopically over the probe tube as the control rod is moved in and out of the nuclear reactor to regulate the fission reaction therein.

As the leadscrew moves over the probe tube the voltage across the inductor changes because of magnetic coupling effects. This change in voltage is directly proportional to the position of the leadscrew and thus the control rod.

A problem with using this method is that it is typically not very accurate. In particular, it has a low span to offset ratio and a low signal span. This is problematic because the measurement instrumentation is typically limited to relatively low signal voltages, and it is thus desirable to maximise the signal span to offset ratio so that the relative position of the leadscrew (and therefore the control rod) can be known with high accuracy.

A further problem with the prior art techniques is that the flux density of the field that is generated around the inductive element is difficult to predict before manufacture. It is common practice, therefore, to manufacture a multitude of inductive elements, the one with the best magnetic field in terms of the spread of the flux ultimately being selected for use.

Indeed, each element may need to be calibrated in situ, so that variations in the local operating environment can be accounted for in the calibration. This is undesirable.

Some prior art methods of measurement use the transformer principle rather than the simple inductor principle. The transformer principle also involves a metallic probe tube and a metallic leadscrew, but the probe tube houses a series of transformer windings alternating between electromagnetically coupled primary and secondary windings along a core. When in operation, a magnetic field is generated between the primary and secondary windings. As the leadscrew moves over the probe tube the magnetic field between the windings is affected such that the voltage generated across the secondary windings changes proportionately to the position of the leadscrew over the probe tube.

An example of a transformer effect sensor is U.S. Pat. No. 5,563,922, which shows the use of a transformer effect to sense the moving metallic item through a metallic enclosure.

However, in the arrangement shown in U.S. Pat. No. 5,563,922, the output signal typically suffers from a low span to offset ratio. As mentioned above is undesirable because it reduces the sensitivity of the sensor and therefore the accuracy to which the relative position of the leadscrew (and therefore the control rod) can be known.

In particular, in arrangements similar to that of U.S. Pat. No. 5,563,922, the signal span is relatively small. And, typically, a large residual magnetic field exists between the primary and secondary windings when the leadscrew is "covered" (i.e. the leadscrew is arranged to cover the probe tube). This typically results in a large voltage offset on the output signal of the sensor, which is undesirable.

In particular, when an output signal is amplified the voltage offset of the signal is also amplified, which causes difficulty for subsequent signalling processing of the output signal; indeed, it can make it difficult to detect the relevant part of the signal, because it is swamped by the amplified offset level (and any associated noise on the offset level).

SUMMARY OF THE INVENTION

The present invention seeks to provide a way to remove the undesirable offset, thus improving the sensor significantly with respect to the known prior art sensors by providing a sensor with an improved signal span to offset ratio, thereby providing a sensor with higher resolution. In other words, the present invention seeks to provide a sensor and/or method which provides a signal indicating the relative location of a metallic object with a higher degree of accuracy than the prior art.

A first aspect provides a sensor assembly for indicating the relative location of a metallic object, the sensor assembly including: a primary electromagnetic coil arranged to generate a time varying magnetic field; and a secondary electromagnetic coil arranged to detect the time varying magnetic field as affected, directly or indirectly, by the object and to output, on the basis of the detected time varying magnetic field, a signal indicative of the relative location of the object; wherein at least one of the primary and secondary electromagnetic coils is wound about a core body formed of a material having the same conductivity and/or magnetic permeability as the object. Accordingly, the signal span to offset ratio of the output of the sensor has a higher resolution than prior art sensors.

The primary and secondary coils may be arranged coaxially.

A plurality of primary electromagnetic coils may be provided. A plurality of secondary electromagnetic coils may be provided.

The plurality of primary and secondary coils may be arranged in a mutually alternating sequence of primary and secondary coils.

The or each primary coil may be wound about a core body formed of a material having the same conductivity and/or magnetic permeability as the object.

The or each secondary coil may be wound about a core body formed of a material having the same conductivity and/or magnetic permeability as the object.

The primary and secondary coils may each be wound about the same core body formed of a material having the same conductivity and/or magnetic permeability as the object.

The primary coils may be mutually arranged in electrical series; and/or wherein the secondary coils may be separately mutually arranged in electrical series.

The primary and/or secondary coils may be formed of an alloy comprising 86% copper, 12% Manganese and 2% Nickel, e.g. Manganin® wire.

The or each core body may be formed of a material having the same conductivity and/or magnetic permeability as the object.

The or each core body may be formed of the same material as the object.

The metallic object may be attached to a (movable) nuclear reactor control rod.

A second aspect provides a method of optimising the output of a sensor as described herein, the method including the steps of:
supplying the primary coil(s) with an alternating current to result in the generated time varying magnetic field;
locating the object in a first position and recording the signal output by the secondary electromagnetic coil(s) for a range of respective frequencies of the supplied alternating current;
locating the object in a second position and recording the signal output by the secondary electromagnetic coil(s) for the range of respective frequencies of the supplied alternating current;
calculating, for each of the respective frequencies, a value for the span to offset ratio of the measured signals on the basis of the respective signals measured for the object in the first and second positions; and
determining the frequency of the supplied alternating current which provides the maximum span to offset ratio on the basis of the calculations.

When the object is in the first location, the output from the secondary coil(s) may be a maximum. When the object is in the second location, the output from the secondary coil(s) may be a minimum.

The calculation step may include, for each respective frequency:
calculating the difference between the amplitudes of the signals measured for the object in the first and second positions; and
dividing the difference by the amplitude of the signal measured for the object in the second position.

The sensor assembly may include a metallic body, within which the primary and secondary coils and core body/bodies are located, and outside of which the metallic object is located.

Thus the sensor assembly is configured to be capable of indicating the relative location of the metallic object even though the coils are separated from the metallic object by the metallic body (within which the coils are located).

A third aspect provides sensor assembly for indicating the location of a leadscrew relative to a probe tube, the leadscrew forming part of a nuclear control rod and the probe tube being moveably connected to the leadscrew, the sensor assembly including:
a primary electromagnetic coil arranged to generate a time varying magnetic field; and
a secondary electromagnetic coil arranged to detect the time varying magnetic field as affected, directly or indirectly, by the leadscrew moving relative to the probe tube and to output, on the basis of the detected time varying magnetic field, a signal indicative of the location of the leadscrew relative to the probe tube;
wherein the primary electromagnetic coil and the secondary electromagnetic coil comprises copper and nickel.

The primary electromagnetic coil and the secondary electromagnetic coil may be formed from a copper-manganese-nickel alloy.

The copper-manganese-nickel alloy may comprise by weight equal to or between 77 and 89% Copper, 10 and 18% Manganese, 1 and 5% Nickel.

The copper-manganese-nickel alloy may comprise by weight 86% Copper, 12% Manganese and 2% Nickel.

Both the primary electromagnetic coil and the secondary electromagnetic coil may comprise copper and nickel.

The sensor assembly may include a temperature indicator to indicate the temperature of the sensor assembly.

The sensor assembly may comprise a processor configured to receive the voltage from the primary electromagnetic coil, the voltage from the secondary electromagnetic coil and an output from the temperature indicator and output a calibrated output that compensates for the temperature of the sensor assembly.

The sensor assembly may comprise a tertiary coil. The tertiary coil may comprise at least 95% by weight copper, for example at least 98% by weight copper, or at least 99% by weight copper.

The tertiary coil may be positioned to surround the primary electromagnetic coil.

The sensor assembly of the third aspect may have one or more of the optional features of the sensor assembly of the first aspect.

A fourth aspect provides a method of indicating the relative location of a leadscrew relative to a probe tube, the leadscrew forming part of a nuclear control rod and the probe tube being moveably connected to the leadscrew, the sensor being of the type according to the first or the third aspect, the method including the steps of:
supplying the primary electromagnetic coil with an alternating current to result in the generated time varying magnetic field;
recording a voltage from the primary coil;
recording the signal output by the secondary electromagnetic coil;
recording a temperature indicator indicative of the temperature of the sensor;
modifying the voltage from the secondary electromagnetic coil based upon the temperature indicator to produce a calibrated secondary voltage; and
calculating a position of the leadscrew based on the calibrated secondary voltage and the voltage recorded from the primary coil.

A fifth aspect provides a method of optimising the output of a sensor for indicating the relative location of a metallic object, the sensor being of the type having a primary electromagnetic coil arranged to generate a time varying magnetic field; and a secondary electromagnetic coil arranged to detect the time varying magnetic field as affected, directly or indirectly, by the object and to output, on the basis of the detected time varying magnetic field, a signal indicative of the relative location of the object, the method including the steps of:
supplying the primary coil with an alternating current to result in the generated time varying magnetic field;
locating the object in a first position and recording the signal output by the secondary electromagnetic coil for a range of respective frequencies of the supplied alternating current
locating the object in a second position and recording the signal output by the secondary electromagnetic coil for the range of respective frequencies of the supplied alternating current;
calculating, for each of the respective frequencies, a value for the span to offset ratio of the measured signals on the basis of the respective signals measured for the object in the first and second positions; and determining the frequency of the supplied alternating current which provides the maximum span to offset ratio on the basis of the calculations.

The sensor may be a sensor assembly according to the first or the third aspects.

When the object is in the first location, the output from the secondary coil may be a maximum; and/or when the object is in the second location, the output from the secondary coil may be a minimum.

The calculation step may include, for each respective frequency:

calculating the difference between the amplitudes of the signals measured for the object in the first and second positions; and dividing the difference by the amplitude of the signal measured for the object in the second position.

The sensor may be positioned within a metallic tube and the metallic object may be arranged to move relative to the tube between a position of minimum overlap and a position of maximum overlap of the tube and the object.

The first position may be a position where there is minimum overlap between the tube and the object.

The second position may be a position where there is maximum overlap between the tube and the object.

At least one of the primary and secondary electromagnetic coils may be wound about a core body formed of a material having the same conductivity and/or magnetic permeability as the object.

The primary and secondary coils may be arranged coaxially.

The sensor may comprise a plurality of primary electromagnetic coils.

The sensor may comprise plurality of secondary electromagnetic coils.

The plurality of primary and secondary coils may be arranged in a mutually alternating sequence of primary and secondary coils.

The or each primary coil may be wound about a core body formed of a material having the same conductivity and/or magnetic permeability as the object.

The or each secondary coil may be wound about a core body formed of a material having the same conductivity and/or magnetic permeability as the object.

The primary and secondary coils may be each wound about the same core body formed of a material having the same conductivity and/or magnetic permeability as the object.

The primary coils may be mutually arranged in electrical series; and/or wherein the secondary coils may be separately mutually arranged in electrical series.

The or each core body may be formed of a material having the same conductivity and/or magnetic permeability as the object.

The or each core body may be formed of the same material as the object.

The metallic object may be attached to a nuclear reactor control rod.

BRIEF DESCRIPTION OF THE DRAWINGS

Embodiments of the invention will now be described by way of example with reference to the accompanying drawings in which:

FIG. 1A shows (half) a cross section of a sensor in situ in a probe tube for measuring the relative location of a control rod leadscrew, where the leadscrew is "uncovered" (i.e. is located distally to the sensor);

FIG. 1B shows (half) a cross section of a sensor in situ in a probe tube for measuring the relative location of a control rod leadscrew, where the leadscrew is "uncovered" (i.e. is located proximally to the sensor);

DETAILED DESCRIPTION

Figure 2:
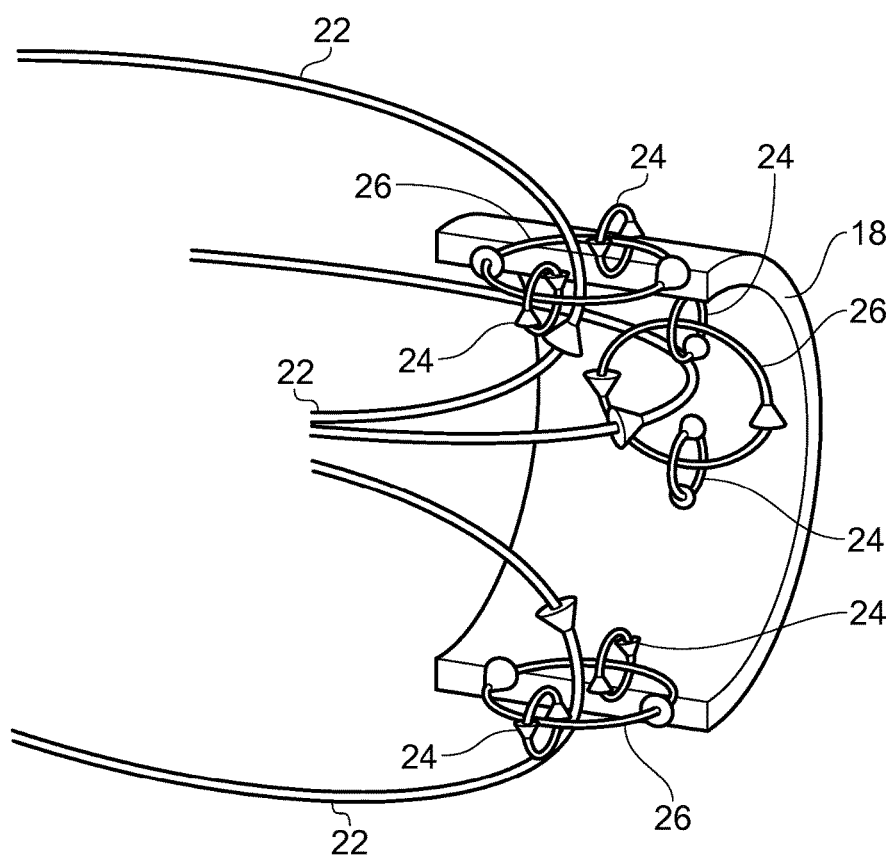
FIG. 2 shows a cutaway view of a nuclear reactor probe tube and indicates the likely field lines generated.

FIG. 1 shows schematic cross sections of a sensor 10. The schematic only shows half of the full arrangement; the full arrangement being mirrored about the dashed line A-A to shown in FIG. 1.

The sensor 10 comprises a plurality of primary coils 12, coaxially arranged with a plurality of secondary coils 14. One or more primary coils 12 may be provided. One or more secondary coils 14 may be provided.

Where a plurality of primary coils 12 are provided, the respective primary coils may be connected in electrical series. Where a plurality of secondary coils 12 are provided, the respective secondary coils may be connected in electrical series.

The primary and secondary coils are arranged in a mutually alternating (physical) series or sequence, such that the sequence of coils along the long axis of the series alternates between individual primary and secondary coils. The primary and secondary coils are not in electrical connection. In other words, between each pair of adjacent primary coils 12 a secondary coil 14 may be provided; and/or between each pair of adjacent secondary coils 14 a primary coil 12 may be provided.

In the embodiment shown, each coil 12, 14 is wound around a single core body 16. However, the coils may be each be wound around a respective core body 16. Or plural sets of two or more of the coils may be wound around respective core bodies.

The coils 12, 14 may be wound around a supporting body, which is itself mounted on to the core body 16. However, the coils 12, 14 may be wound directly on to the core body 16. In either case the coils 12, 14 may be referred to as bobbins.

In one particular use, the sensor 10 is mounted inside a probe tube 18 which extends or projects into a region containing the primary water surrounding a nuclear reactor. In this example, for safety reasons the probe tube must be metallic.

Within the aforementioned region the nuclear reactor control rods (not shown) are movable, to be inserted into or withdrawn from the nuclear reactor itself. Typically, each control rod is attached to a leadscrew 20, such that movement of the nuclear rod causes movement of its respective leadscrew. It is the accurate detection of the movement, or more accurately the relocation, of the leadscrew that the present disclosure aims to provide.

As the control rod is moved, the leadscrew 20 moves along the probe tube 18. At one extreme, the leadscrew may not cover any part of the probe tube, as shown in FIG. 1A. This may occur for example when the control rod is fully inserted into the nuclear reactor core. At another extreme, the leadscrew may fully cover the probe tube, as shown in FIG. 1B, for example when the control rod is fully withdrawn from the nuclear reactor core.

Therefore, to assist in the understanding of the present example, FIG. 1A shows the leadscrew in the "uncovered" position, whereby the leadscrew 20 is withdrawn from the probe tube 18; whereas FIG. 1B shows the leadscrew in the "covered" position, whereby the leadscrew 20 is arranged proximate to the sensor, e.g. to cover the probe tube 18. In FIG. 1A the nuclear reactor control rod (not shown) to which the leadscrew 20 is attached may be at a maximum insertion in the nuclear reactor core for example. Whereas, in FIG. 1B the nuclear reactor control rod (not shown) to which the leadscrew 20 is attached may be at a maximum extent of withdrawal from the nuclear reactor core, for example.

In order to control the reaction within the nuclear reactor core in a reliable and safe manner it is important to know the relative location of the leadscrew 20, and therefore of the control rod, with a high degree of accuracy.

During operation of a sensor, the primary coils 12 of the sensor 10 are supplied with an alternating (AC) current so as to result in a time varying magnetic field being produced by the primary coils 12. The time varying magnetic field interacts with the local environment, including the probe tube 18, the core body 16 and the leadscrew 20.

The time varying magnetic field, as affected by the local environment, induces in the secondary coils 14 a corresponding AC current, and the secondary coils therefore output a corresponding signal indicative of the time varying magnetic field which induced the AC current in the secondary coils.

Changes in the local environment, such as relocation, or repositioning, of the leadscrew 20 will alter the time varying magnetic field, and therefore will consequently alter the current induced in the secondary coils 14. Thus the corresponding output signal will be changed.

This change in the signal output of the secondary coils is detectable, and can be used to establish the relative location of the leadscrew 20, and thus of the control rods.

As discussed above, similar prior art sensor arrangements (e.g. U.S. Pat. No. 5,563,922) suffer from disadvantages that mean the accuracy of the determination of the relative location of the leadscrew can be improved significantly. The present inventor has realised that an important factor when considering how to improve the accuracy of said determination is the (signal) span to offset ratio.

The signal span is the measurable signal span from the minimum signal to the maximum signal, and the offset is the minimum achievable signal.

It is often difficult, if not impossible, to achieve a zero offset in a measured signal. Noise and residual signal inducing effects (e.g. residual magnetic fields in the context of the present discussion) mean that a non-zero signal offset is almost inevitable in any measurement system.

Systems such as that shown in U.S. Pat. No. 5,563,922 often suffer from relatively small signal spans and undesirably large signal offsets, meaning that the overall accuracy of the measurement system can suffer.

The present inventor currently considers that the (static) local environment around the sensor 10 is responsible for disadvantages discussed above. For example, as shown in FIG. 2, the time varying magnetic field 22 generated by the primary coils 12 results in a secondary electromagnetic field 24 in the metallic probe tube 18 (due to the produced eddy current 26) which can adversely affect the signal output by the secondary coils 14 by reducing the signal span to offset ratio for example. Other aspects of the local environment can also affect the signal span and signal offset. For example, the core body 16 about which the respective coils are wound.

The present inventor has realised that one way to significantly improve the (signal) span to offset ratio to achieve excellent accuracy in determining the relative location of the leadscrew 20, is to ensure that the core body 16 is formed of a material having the same permeability and/or conductivity as the material from which the leadscrew 20 is formed.

Indeed, in particularly preferred embodiments, the core body 16 is formed of the same material as the leadscrew 20. In such embodiments, ideally, the core body would be formed of the same production batch of material as the leadscrew 20, although this is not strictly necessary for the sensor to work.

Figure 3:
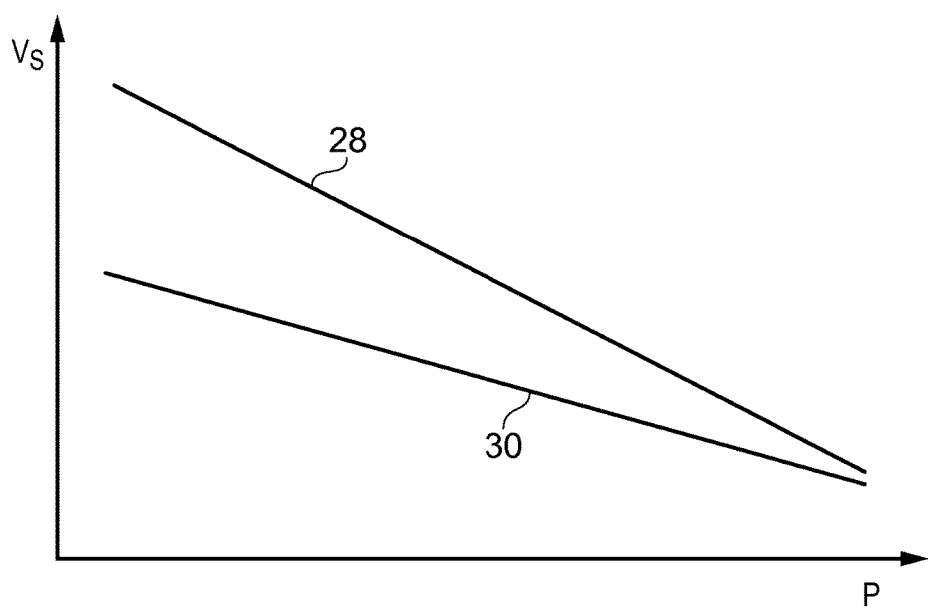
FIG. 3 shows a plot indicating the effect, at an arbitrary 400 Hz, on the signal span to offset ratio when the material of the core body is matched to that of the object to be detected.

FIG. 3 shows a plot demonstrating the advantageous effect on the SoR (signal span to offset ratio) of the output signal of the secondary coils 12 when the material (or the permeability and/or conductivity characteristics) of the core body 16 is matched to the material from which the leadscrew is formed. Line 28 indicates the output signal $V_S$ against leadscrew position P for the sensor of the present embodiment. Line 30 is provided for comparison purposes and indicates an output signal against leadscrew position for a sensor where the material of the core 16 is different to the material of the leadscrew 20 (including having a different conductivity and a different magnetic permeability).

To produce FIG. 3, an arbitrary frequency of 400 Hz for the AC current supply to the primary coils 12 was chosen.

To calculate the SoR at the arbitrary frequency of 400 Hz, the output signal from the secondary coils 14 was measured for the uncovered leadscrew arrangement (i.e. where the leadscrew is distal to the sensor as in FIG. 1A) and separately for the covered leadscrew (i.e. the leadscrew at least partially ensheathing the sensor 10 and probe tube 16 as shown in FIG. 1B). Typically this provides values representative of the maximum output signal and the minimum output signal respectively.

The difference between the measured values was then calculated to obtain the signal span. The result was then divided by the measured signal corresponding to the covered leadscrew (i.e. at least partially ensheathing the sensor) which typically corresponds with the offset of the measured signal.

The result of the division operation gives the span to offset ratio (SoR) for the output signal at the chosen 400 Hz.

For a typical prior art arrangement without core matching (without matching the material characteristics of the core body 16 to that of the leadscrew 20), the SoR at 400 HZ was determined to be around 0.8 only.

However, for a sensor arrangement according to the present embodiment, which adopts the principle of matching the permeability and/or conductivity characteristics of the core body material to that of the leadscrew material (for example, by matching the material of the core body 16 to that of the leadscrew 20), the SoR at 400 HZ was determined to be 2.26.

Thus, the described sensor arrangement can provide a very significant improvement in the SoR of the output signal from the secondary coils 14.

This is particularly advantageous where the output signal of the secondary coils may be fed to a measurement system via a data acquisition card having a maximum input voltage. For example, such data acquisition cards may have a maximum input voltage of 5V. Therefore, improving the SoR within the available 5V range means that the resolution of the acquired signal is improved, and thus the subsequent processing can produce a more accurate result for the determination of the relative location of the leadscrew 20.

Figure 4:
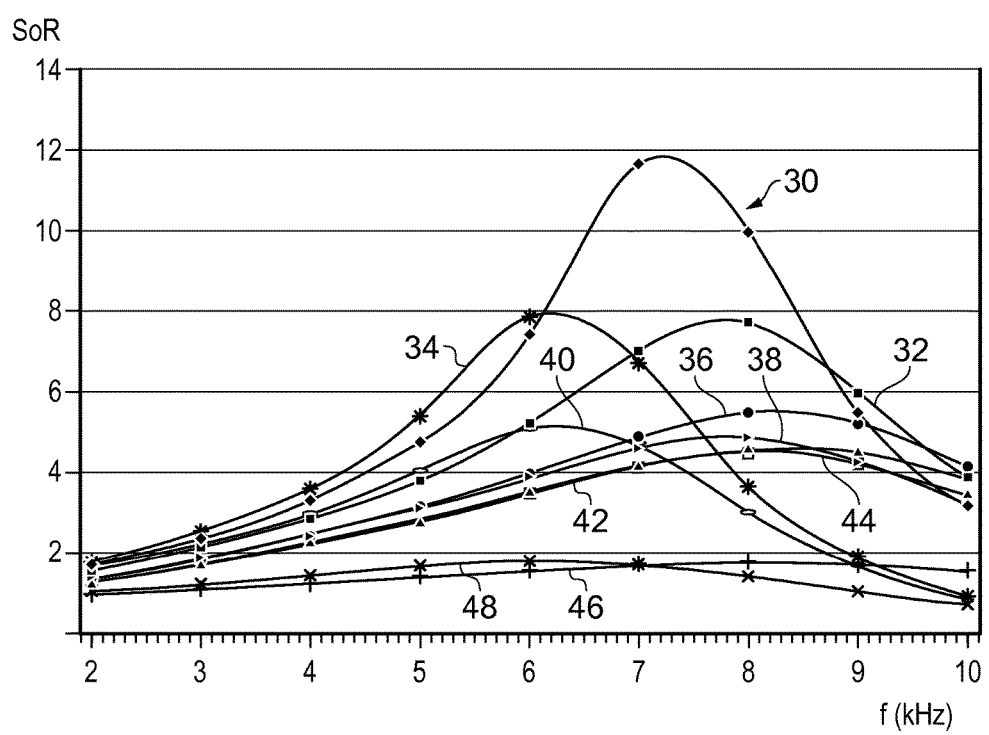
FIG. 4 shows a plot indicating the AC supply current frequency dependence of the signal span to offset ratio of the output signal for various material of core body.

To demonstrate that matching the conductivity and/or magnetic permeability of the core body material to that of the leadscrew 20 is particularly advantageous in achieving an optimum SoR for the output signal of the secondary coils 14, the present inventor has conducted extensive finite element analysis, a resulting plot of the SoR for various metals against the frequency of the AC current supply to the primary coils 12 is shown in FIG. 4.

In FIG. 4, line 30 is the plot of HAS4104; line 32 is the plot for grey cast iron; line 34 is the plot for ingot iron; line 36 is the plot for powdered iron; line 38 is the plot for supermendur (a cobalt-iron alloy); line 40 is the plot for pure iron; line 42 is the plot for Sinimax (a nickel-iron alloy); line 44 is the plot for Mumetal® (a nickel-iron alloy); line 46 is the plot for Inconel 625 (a nickel-chromium alloy); and line 48 is the plot for stainless steel.

The finite element analysis has shown that the particular characteristics of the material of the core body 16 which contribute to the significant improvement of SoR are the conductivity of the core body material and the magnetic permeability of the core body material. In particular, the finite element analysis has shown that the improvement in the SoR of the output of the sensor 10 to be most significant when the magnetic permeability and/or the conductivity values of the core body material is/are matched closely to the magnetic permeability and/or conductivity values of the material from which the object to be detected is formed—here, the object to be detected typically being a leadscrew 20 formed of a particular metal.

To demonstrate this effect, FIG. 4 shows the primary coils 12 AC current frequency dependency of the SoR of the output signal of the secondary coils 14 for various different materials of core body 16 for a leadscrew formed of a material referred to as HAS 4104, or DGS MS HAS 4104, which is a stainless having a high magnetic permeability. This material was chosen for the leadscrew material in this study because it is the typical material from which the leadscrews in nuclear reactors are formed.

As can be seen from FIG. 4, the highest SoR is achieved for a core material of HAS4104, i.e. a material matching the material of the leadscrew which is also formed of HAS4104.

So, where leadscrews are typically formed of HAS4104, embodiments for use in nuclear reactors employing such leadscrews may also have a core body 16 formed of HAS 4104.

The SoR is also dependent on frequency. Not only will the electrical circuitry typically demonstrate a resonance peak, but the materials in the local environment will demonstrate different responses depending on the frequency of the time varying magnetic field generated by the primary coils.

For example, a peak at around 7.5 KHz is observed in FIG. 4 when the core body 16 is formed of HAS4104 material. The SoR at this frequency is calculated to be around 11.

This result for the SoR is calculated as follows, taking the suitable voltage values from FIG. 5 (in FIG. 5, line 50 is the line plotted for a core body of HAS4104, and line 52 is for a core body of stainless steel 316):

Core body of HAS4104: (2.35V−0.19V)/0.19V=~11

Figure 5:
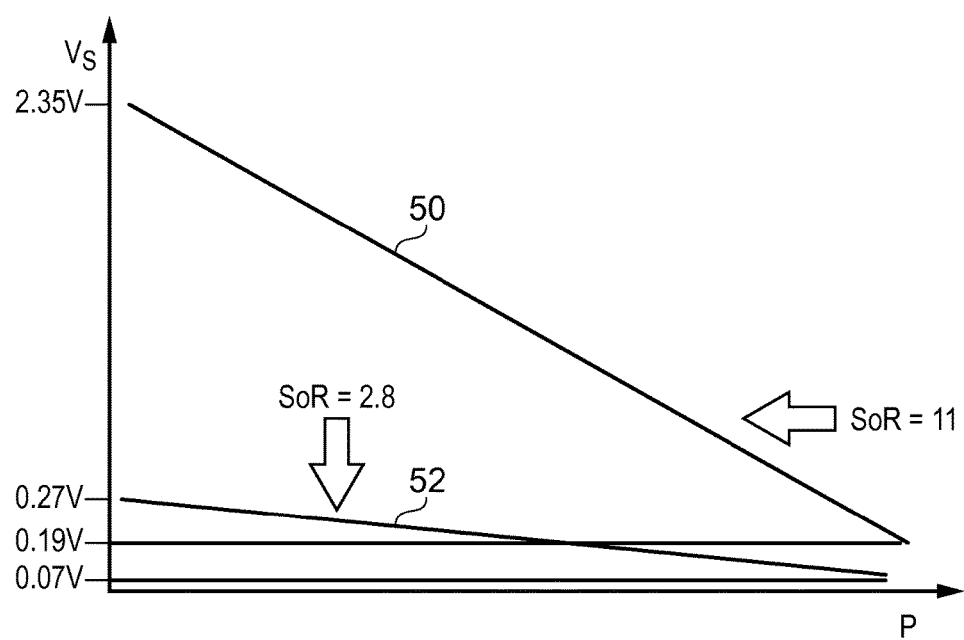
FIG. 5 shows a plot, at an optimum 7.5 kHz, of the signal span to offset ratio when the material of the core body is matched to that of the object to be detected.

As shown in FIG. 5, if an alternative material is used for the core body 16, which does not have conductivity and/or permeability characteristics which match with the HAS4104 of the leadscrew, the SoR is shown to be only around 2.8. This result for the SoR is calculated as follows, taking the suitable voltage values from FIG. 5:

Core body of stainless steel 316: (0.27V−0.07)/0.07=~2.8

Therefore, the present disclosure surprisingly offers an improvement in the SoR of almost four times. Interestingly, this is achieved with an alternative material which is not a wildly different material to HAS4104, but which is another stainless steel: stainless steel 316.

The present inventor has therefore demonstrated that a careful selection of the material for the core body 16 can have a surprisingly large advantageous effect on the SoR of the output signal of the secondary coils 14.

As can be seen from FIG. 4, the optimum SoR is provided at a particular frequency, and so the present disclosure also proposes a method for determining the frequency at which the optimum SoR exists for a particular system.

The object to be detected, for example the leadscrew 20, is arranged distally from the sensor 10; for example at its furthest distance from the sensor 10. In the case of the leadscrew, the control rod may be fully inserted into the nuclear reactor, for example.

With the leadscrew 20 in this position, the primary coils are provided with AC current at a range of (two or more) discrete frequencies f, and the output signal $V_S$ from the secondary coils measured and recorded for each respective frequency.

Figure 6:
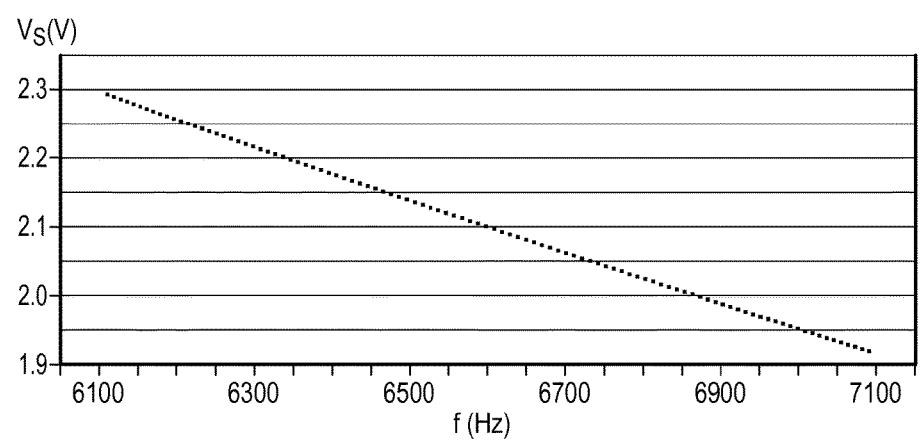
FIG. 6 shows a plot of the output signal at a range of frequencies with the leadscrew in a first predetermined position.

The result of such an exercise is shown in FIG. 6 for example.

The object to be detected, for example the leadscrew 20, is also arranged at proximally to the sensor 10; for example at its nearest position to the sensor 10. In the case of the leadscrew 20, the control rod may be at its maximum withdrawal from the nuclear reactor for example.

With the leadscrew in this position, the primary coils 12 are provided with AC current at the same range of the same (two or more) discrete frequencies f, and the output signal $V_S$ from the secondary coils 14 measured and recorded for each respective frequency.

Figure 7:
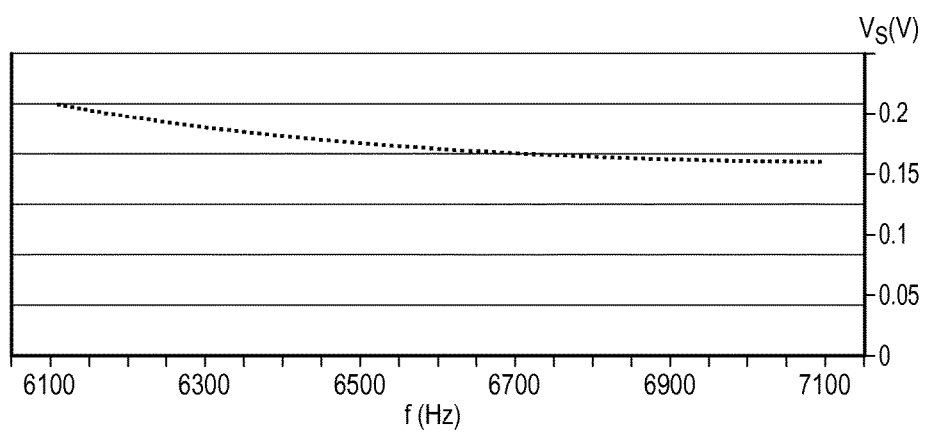
FIG. 7 shows a plot of the output signal at a range of frequencies with the leadscrew in a second predetermined position.

The result of this exercise is shown in FIG. 7 for example, where the effect of the object (the leadscrew) on the signal output by the secondary coils 14 can clearly be seen by comparison of FIG. 7 with FIG. 6.

Then the SoR at each frequency is determined in accordance with the calculation discussed above in relation to FIG. 5, to determine the frequency f at which the SoR is a maximum. In other words, for each frequency, the minimum measured output signal is subtracted from the maximum measured signal to generate a difference value, and the difference value is divided by the minimum value to generate the SoR value.

Figure 8:
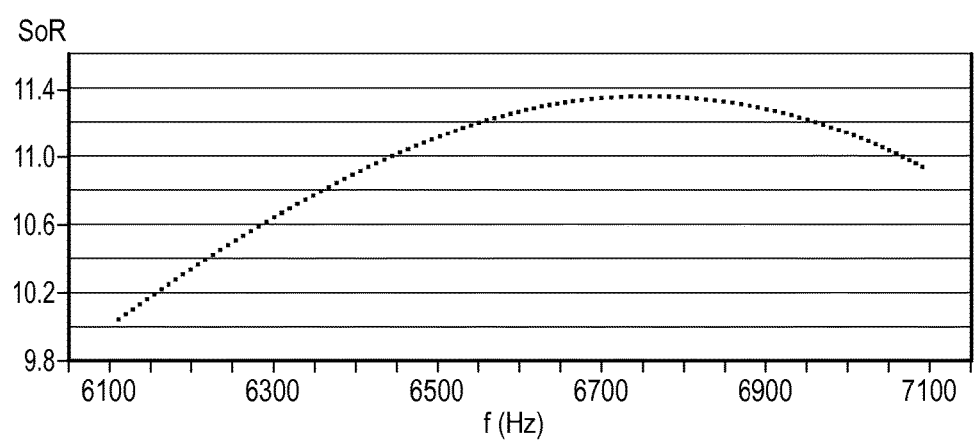
FIG. 8 shows a plot of the signal span to offset ratio for the signals across the range of frequencies indicated in FIGS. 6 and 7.

For the range of frequencies f measured, FIG. 8 shows a plot of the SoR. As can be seen, for the particular arrangement used in the demonstration, the SoR reaches a maximum value of around SoR=11.4 at around 6.75 kHz.

Therefore, for the particular sensor and the local environment in which the sensor was located in this demonstration, the AC current should ideally be supplied to the primary coils 12 at around 6.75 KHz in order to maximize the SoR of the output signal of the secondary coils.

Accordingly, the present embodiment provides a position sensor which provides an output signal indicative of the relative position of an object to be detected with a higher resolution than equivalent sensor arrangements in the prior art.

This is achieved by winding the primary coil(s) and secondary coil(s) around one or more core bodies formed of a material having similar characteristics to the material of the object to be detected. In particular, it is preferred that the material of the one or more core bodies has a conductivity and/or magnetic permeability which matches the material of the object to be detected. In most preferred embodiments, the material of the one or more bodies is the same as the material of the object to be detected.

In this way, a sensor arrangement according to the present embodiment provides a higher SoR and span output signal when detecting metallic objects through another metallic body. This provides major advantages in high accuracy and resolution measurement systems. The ability to provide the downstream instrumentation detection electronics with good resolution sensor signals enables errors to be reduced significantly, thereby allowing the overall system to be more accurate and to offer better resolution.

In particular, a sensor according to the present embodiment, especially when used in conjunction with the SoR optimisation technique disclosed herein, offers a greatly improved means to measure linear displacement of a metallic device through another metallic device.

In the sense that a sensor 10 according to the present embodiment generates a signal for interaction with the local environment and measures the effect on the signal in order to output a signal indicative of a change in the local environment, the sensor 10 may be considered to be a transducer, and may be referred to as such.

As mentioned above, a sensor according to the present embodiment is particularly suited to use in a nuclear reactor, where the temperature of the local environment may fluctuate to a large extent. A large fluctuation in temperature will likely change the resistive properties of the primary and/or secondary coils, and therefore will likely change the SoR of the output signal of the secondary coils.

Figure 9:
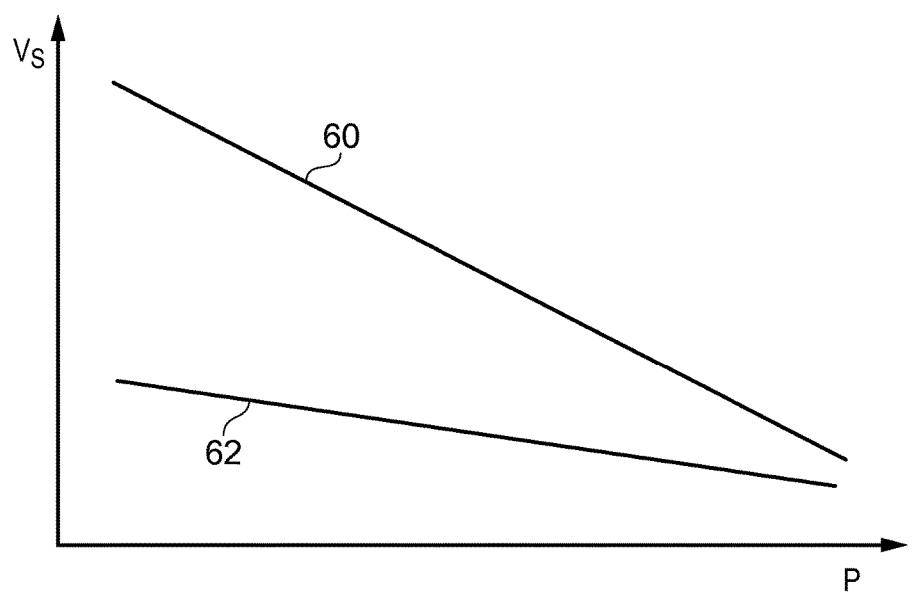
FIG. 9 shows a plot of the output signal at a range of positions of the leadscrew at a maximum sensor temperature of 20° C. and 200° C.

Referring to FIG. 9, the output $V_S$ from the secondary coil 14 at varying positions of the leadscrew 20 is illustrated for a sensor 10 where the primary coil 12 and the secondary coil 14 are made from copper. The line 60 indicates the variation of the output $V_S$ from the secondary coil for varying positions P of the leadscrew at 200° C. and line 62 indicates the variation of the output from the secondary coil for varying positions of the leadscrew at 20° C.

The temperatures given are measured at a position on the sensor having a maximum temperature, in this case this is in a region at the bottom of the probe tube 18. It can be seen from FIG. 9, that a change in maximum temperature from 200° C. to 20° C. significantly affects the output from the secondary coil. This means that the output from the secondary coil is undesirably dependent upon the temperature of the system. Furthermore, at lower temperatures the change in output for a given position change of the leadscrew decreases, which in turn impacts the sensitivity of the sensor.

Figure 10:
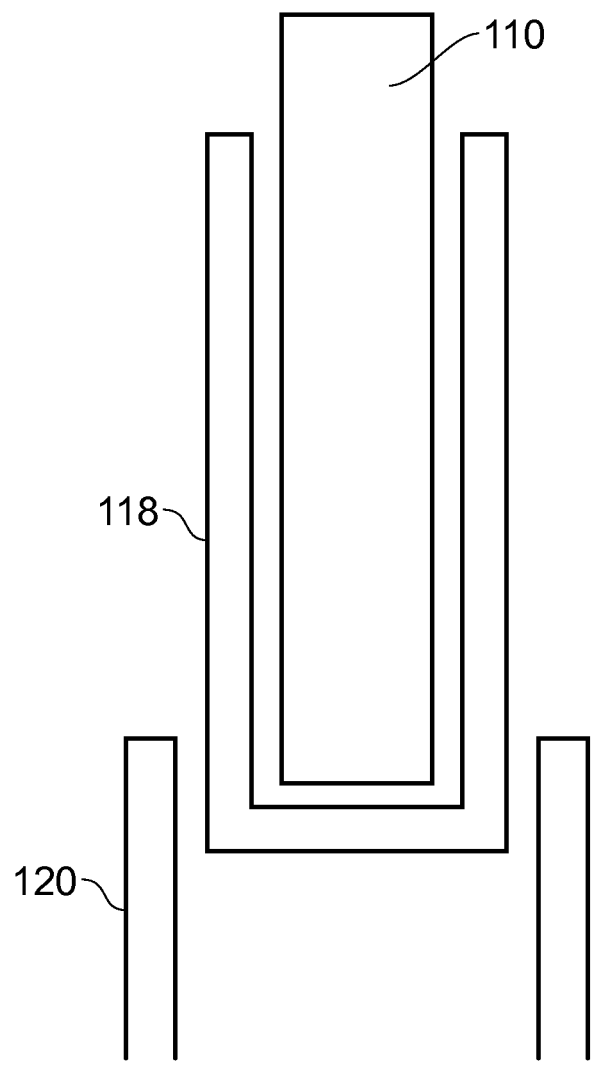
FIG. 10 schematically shows a cross section of a further sensor.

Referring to FIG. 10 a sensing arrangement that attempts to address this temperature dependence problem is illustrated. The arrangement of FIG. 10 is similar to the arrangement previously described, and similar features are given a similar reference numeral but with a pre-fix "1" to distinguish between embodiments. Only the differences between the embodiments will be described in detail.

As illustrated in FIG. 10, similar to the previously described embodiment, the arrangement includes a sensor 110 positioned in a probe tube 118, and the probe tube 118 is moveable relative to a leadscrew 120.

Figure 11:
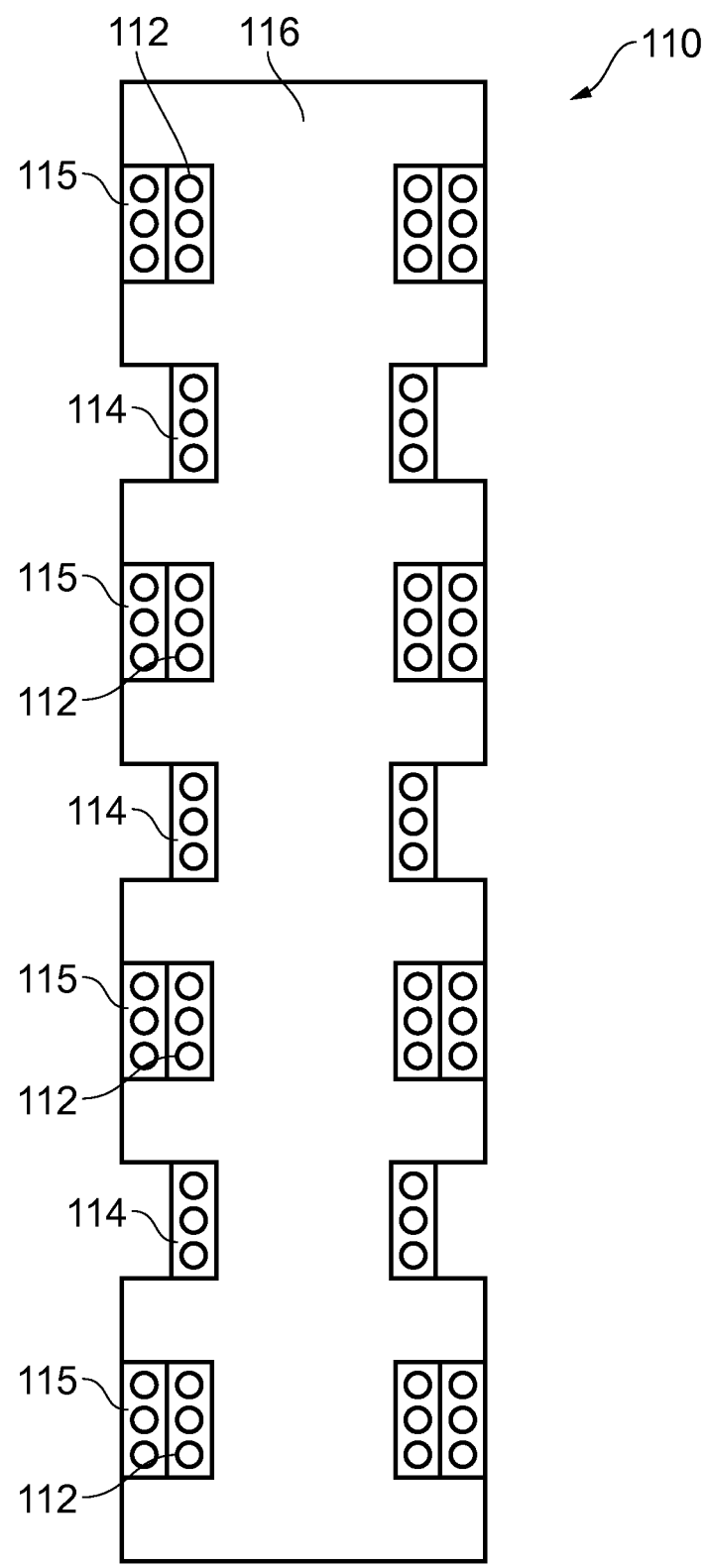
FIG. 11 schematically shows a cross section of the sensor of FIG. 10.

Referring now to FIG. 11, the sensor 110 is shown in more detail. Similar to the previously described sensor, the sensor 110 includes a series of primary coils 112 and secondary coils 114. In the presently described embodiment, the primary coils and the secondary coils are made from a copper-manganese-nickel alloy. In particular, the primary and secondary coils are made from Manganin®. Manganin® is a Copper-manganese-nickel alloy, and is generally provided in the ratio of 86:12:2 by weight.

Figure 12:
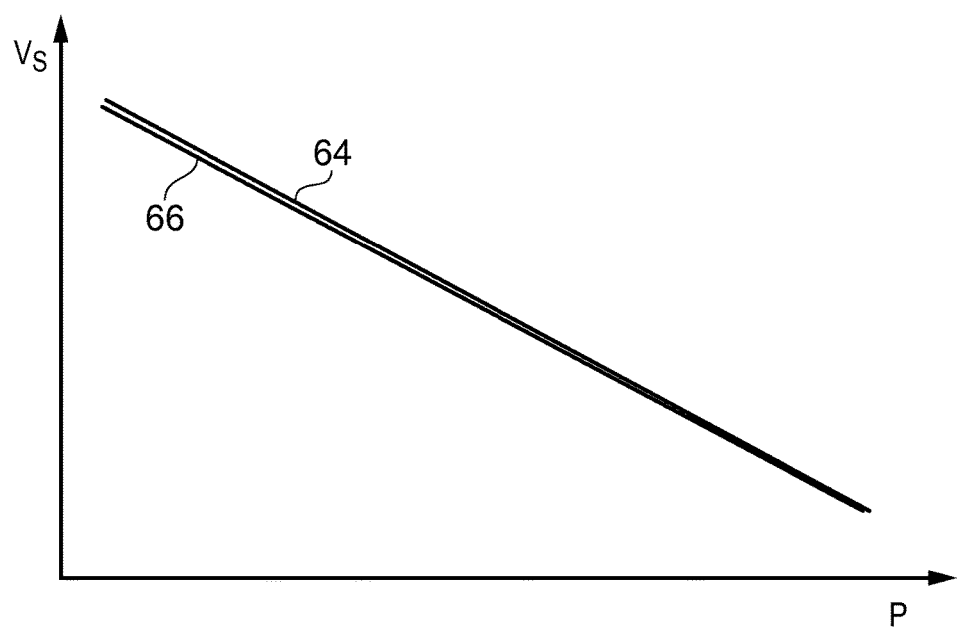
FIG. 12 shows a plot of the output signal from the sensor of FIG. 10 at a range of positions of the leadscrew at a maximum sensor temperature of 20° C. and 200° C.

FIG. 12 illustrates the output $V_S$ from the secondary coil 114 at varying positions P of the leadscrew. Line 64 illustrates the output from the secondary coil at 200° C. and line 66 illustrates the output from the secondary coil at 20° C. As can be seen from FIG. 12, the use of manganin wire significantly reduces the temperature dependence of the output from the secondary coil both in terms of magnitude for a given position of the leadscrew as well as in terms of the change in magnitude for a step change in position of the leadscrew.

However, it can be seen from FIG. 12 that there is still some variation in the output $V_S$ from the secondary coil 114. It is believed that this variation is due to probe tube and leadscrew thermal effects, primarily probe tube thermal effects.

Referring again to FIG. 11, the sensor 110 is further optimised to include a tertiary coil 115. The tertiary coil is arranged substantially coaxially with the primary coil 112 and is positioned radially outside of the primary coil. However, in alternative embodiments the tertiary coil could surround the secondary coil or surround both the primary and secondary coils, or be positioned at any other suitable position on the core 116. The tertiary coil is made from copper or an alloy thereof.

Figure 13:
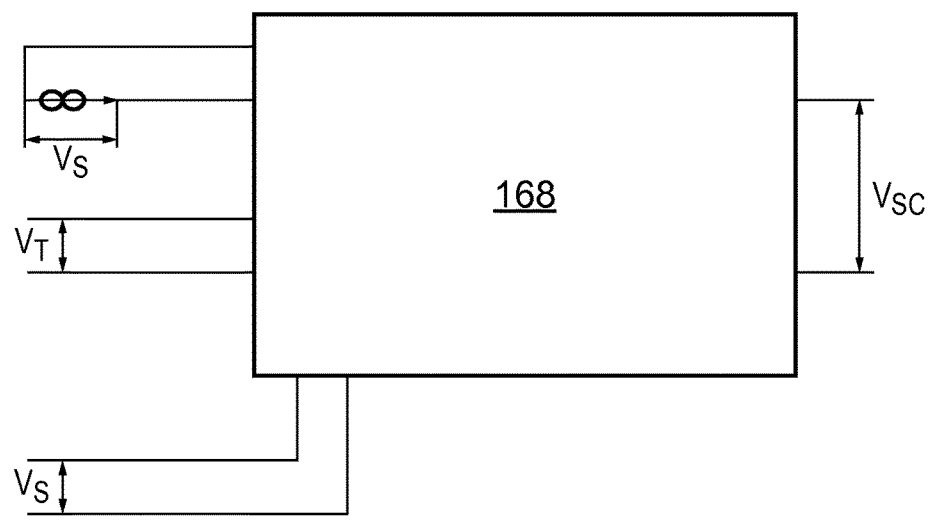
FIG. 13 schematically shows a processor for calibrating an output from the sensor of FIG. 10.

Referring now to FIG. 13, the sensor is connected to a processor 168. The voltage $V_P$ from the primary coil, the Voltage $V_S$ from the secondary coil and the Voltage $V_T$ from the tertiary coil are transmitted to the processor. The processor receives the voltage from the primary coil, secondary coil and tertiary coil and performs a compensation procedure. The algorithm for the compensation procedure can be established using techniques known in the art and will vary depending on the specific environment in which the sensor is used. Once the processor has performed the compensation procedure, the processor outputs a calibrated secondary coil output $V_{SC}$. The compensation procedure can remove the variation in output from the secondary coil illustrated in FIG. 12, so that the calibrated secondary coil output $V_{SC}$ is independent of the temperature of the sensor.

In alternative embodiments, the primary and secondary coils may be made from an alloy such as constantan (a copper-nickel alloy). However, the inventor has found Manganin® to provide an optimum SoR.

In the present embodiment, the tertiary coil is provided with an AC current, but in alternative embodiments the tertiary coil may be provided with a DC current. In further alternative embodiments, the tertiary coil may be replaced with another type of temperature indicator.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The invention claimed is:

1. A sensor assembly for measuring the relative position of a control rod connected to a lead screw within a nuclear reactor from within a metallic probe tube housing the sensor assembly, the sensor assembly including:
a primary electromagnetic coil arranged to generate a time varying magnetic field; and
a secondary electromagnetic coil coaxial with the primary electromagnetic coil, the primary and secondary electromagnetic coils being wound around a core body coaxially, the secondary electromagnetic coil being arranged
to detect the time varying magnetic field as affected, directly or indirectly, by the lead screw, and
to output, on the basis of the detected time varying magnetic field, a signal indicative of the relative location of the lead screw;
wherein
the core body being formed of a material having the same conductivity and/or magnetic permeability as the lead screw to which the control rod is connected in the nuclear reactor.

2. A sensor assembly according to claim 1 including a plurality of primary electromagnetic coils.

3. A sensor assembly according to claim 1 including a plurality of primary and secondary coils, wherein the primary coils are mutually arranged in electrical series; and/or wherein the secondary coils are separately mutually arranged in electrical series.

4. A sensor assembly according to claim 1 wherein the primary and/or secondary coils are formed of an alloy comprising 86% copper, 12% Manganese and 2% Nickel.

5. A sensor assembly according to claim 1 wherein the core body is formed of the same material as the lead screw.

6. A sensor assembly according to claim 1 including a plurality of secondary electromagnetic coils.

7. A sensor assembly according to claim 6 wherein the plurality of primary and secondary coils are arranged in a mutually alternating sequence of primary and secondary coils.

8. A method of optimising the output of a sensor assembly for measuring the relative position of a control rod connected to a lead screw within a nuclear reactor from within a metallic probe tube housing the sensor assembly, the sensor assembly including a primary electromagnetic coil arranged to generate a time varying magnetic field and a secondary electromagnetic coil coaxial with the primary electromagnetic coil, the primary and secondary electromagnetic coils being wound around a core body coaxially, the secondary electromagnetic coil being arranged to detect the time varying magnetic field as affected, directly or indirectly, by the lead screw, and to output, on the basis of the detected time varying magnetic field, a signal indicative of the relative location of the lead screw, the core body being formed of a material having the same conductivity and/or magnetic permeability as the lead screw to which the control rod is connected in the nuclear reactor, the method including the steps of:
supplying the primary coil with an alternating current to result in the generated time varying magnetic field;
locating the lead screw in a first position and recording the signal output by the secondary electromagnetic coil for a range of respective frequencies of the supplied alternating current;
locating the lead screw in a second position and recording the signal output by the secondary electromagnetic coil for the range of respective frequencies of the supplied alternating current;
calculating, for each of the respective frequencies, a value for the span-to-offset ratio of the measured signals on the basis of the respective signals measured for the lead screw in the first and second positions; and
determining the frequency of the supplied alternating current which provides the maximum span-to-offset ratio on the basis of the calculations.

9. A method according to claim 8, wherein
when the lead screw is in the first position, the output from the secondary coil is a maximum; and/or
when the lead screw is in the second position, the output from the secondary coil is a minimum.

10. A method according to claim 8, wherein
the calculation step includes, for each respective frequency:
calculating the difference between the amplitudes of the signals measured for the lead screw in the first and second positions; and
dividing the difference by the amplitude of the signal measured for the lead screw in the second position.

11. A combination of a lead screw connected to a control rod within a nuclear reactor and a sensor assembly for measuring the relative position of the control rod connected to the lead screw within the nuclear reactor from within a metallic probe tube housing the sensor assembly, the combination including:
a lead screw connected to a control rod within a nuclear reactor; and
a sensor assembly including:
a primary electromagnetic coil arranged to generate a time varying magnetic field; and
a secondary electromagnetic coil coaxial with the primary electromagnetic coil, the primary and secondary electromagnetic coils being wound around a core body coaxially, the secondary electromagnetic coil being arranged
to detect the time varying magnetic field as affected, directly or indirectly, by the lead screw, and
to output, on the basis of the detected time varying magnetic field, a signal indicative of the relative location of the lead screw;
wherein
the core body being formed of a material having the same conductivity and/or magnetic permeability as the lead screw to which the control rod is connected in the nuclear reactor.

* * * * *